(12) United States Patent
Inagaki

(10) Patent No.: US 7,037,951 B2
(45) Date of Patent: May 2, 2006

(54) PROCESS FOR REGENERATING RESINS

(75) Inventor: Yasuhito Inagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/296,863

(22) PCT Filed: Mar. 27, 2002

(86) PCT No.: PCT/JP02/02996

§ 371 (c)(1),
(2), (4) Date: Nov. 27, 2002

(87) PCT Pub. No.: WO02/079303

PCT Pub. Date: Oct. 10, 2002

(65) Prior Publication Data

US 2003/0134914 A1    Jul. 17, 2003

(51) Int. Cl.
*C08J 11/04* (2006.01)

(52) U.S. Cl. .................. 521/40.5; 521/47; 521/48; 524/424; 525/132

(58) Field of Classification Search ............... 521/40.5, 521/47, 48; 524/424; 525/132
See application file for complete search history.

(56) References Cited

U.S. PATENT DOCUMENTS

| | | | | |
|---|---|---|---|---|
| 5,436,397 A | * | 7/1995 | Okada | .................. 524/494 |
| 5,645,603 A | * | 7/1997 | Peters | .................. 623/23.61 |
| 5,672,679 A | * | 9/1997 | Takagi et al. | .................. 528/501 |
| 5,789,470 A | * | 8/1998 | Herbst et al. | .................. 524/100 |
| 6,610,758 B1 | * | 8/2003 | Suzuki | .................. 521/40.5 |
| 2001/0007888 A1 | * | 7/2001 | Asano | .................. 524/115 |

FOREIGN PATENT DOCUMENTS

| | | | |
|---|---|---|---|
| JP | 1976JP-0086976 | * | 7/1976 |
| JP | 05-154861 | | 6/1993 |
| JP | 05-508122 | | 11/1993 |
| JP | 07-205149 | | 8/1995 |
| JP | 08-245756 | | 9/1996 |
| JP | 09-248824 | | 9/1997 |
| JP | 10-202658 | | 8/1998 |
| JP | 11-100448 | | 4/1999 |
| JP | 11-226956 | * | 8/1999 |
| JP | 2000-63558 | | 2/2000 |
| JP | 2000204234 | * | 7/2000 |
| JP | 2000-281846 | | 10/2000 |
| JP | 200-319493 | | 11/2000 |
| JP | 2-111225 A | * | 1/2001 |
| JP | 2001-254024 | | 9/2001 |
| JP | 2002-88212 | | 3/2002 |
| WO | WO 00/53384 | | 9/2000 |

* cited by examiner

*Primary Examiner*—Bernard Lipman
(74) *Attorney, Agent, or Firm*—Sonnenschein Nath & Rosenthal LLP

(57) ABSTRACT

The present invention is a process for regenerating a used resin and prevents deterioration in the quality of the resin by adding to the used resin an another resin having given physical properties superior to those of the used resin and then regenerating the resin.

1 Claim, 3 Drawing Sheets

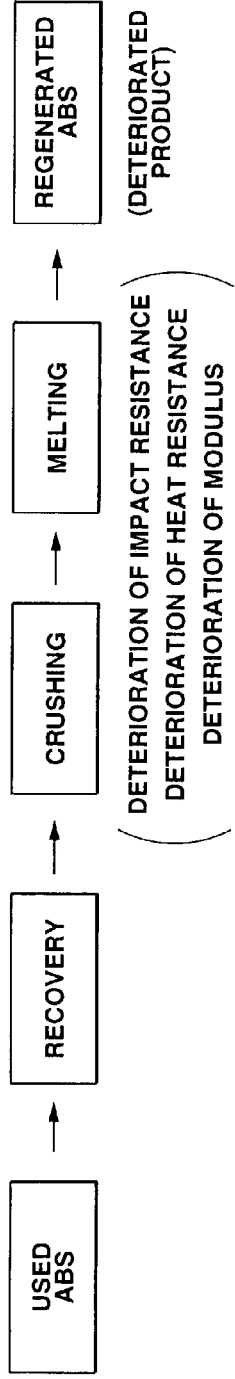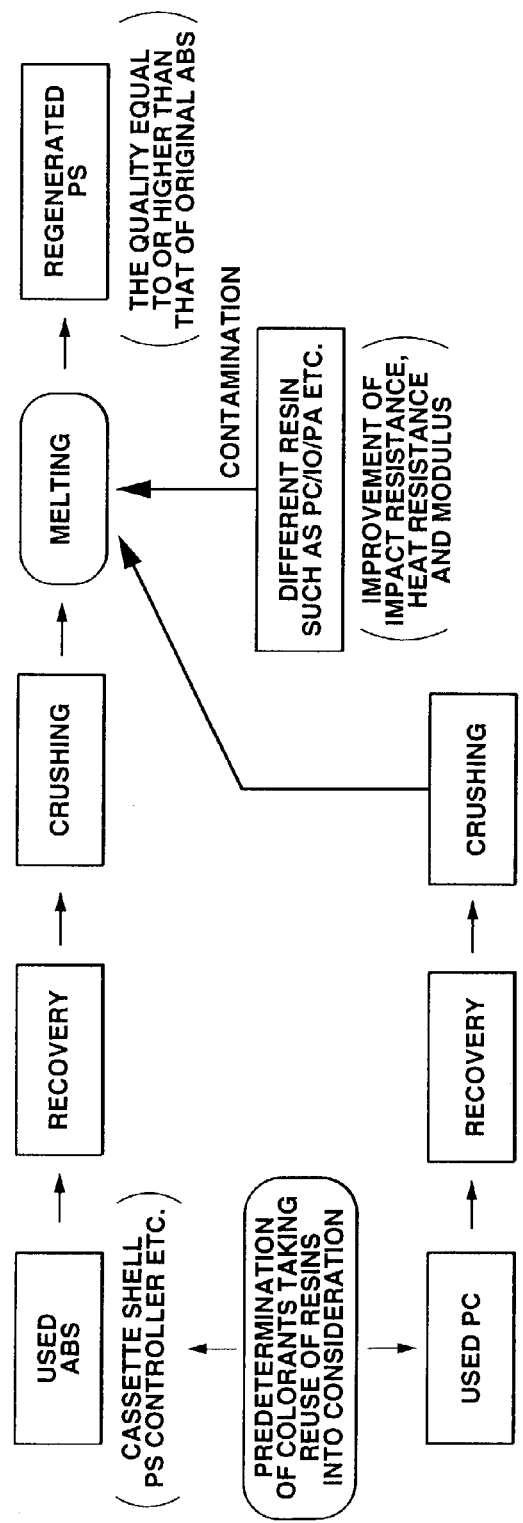

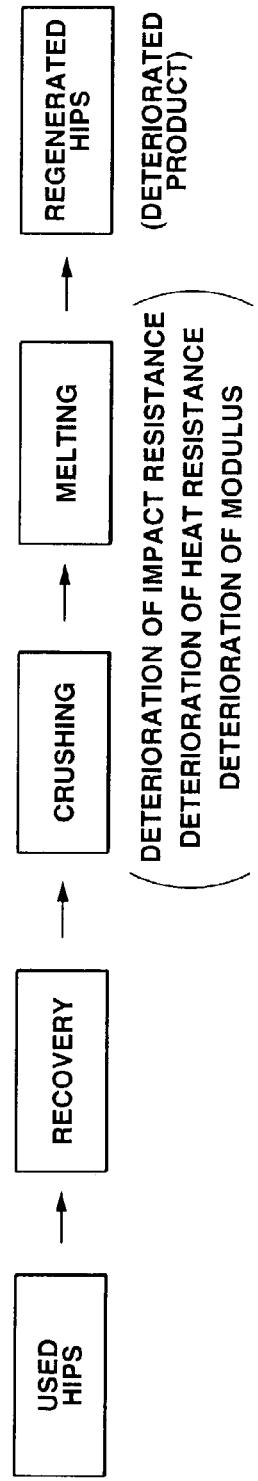
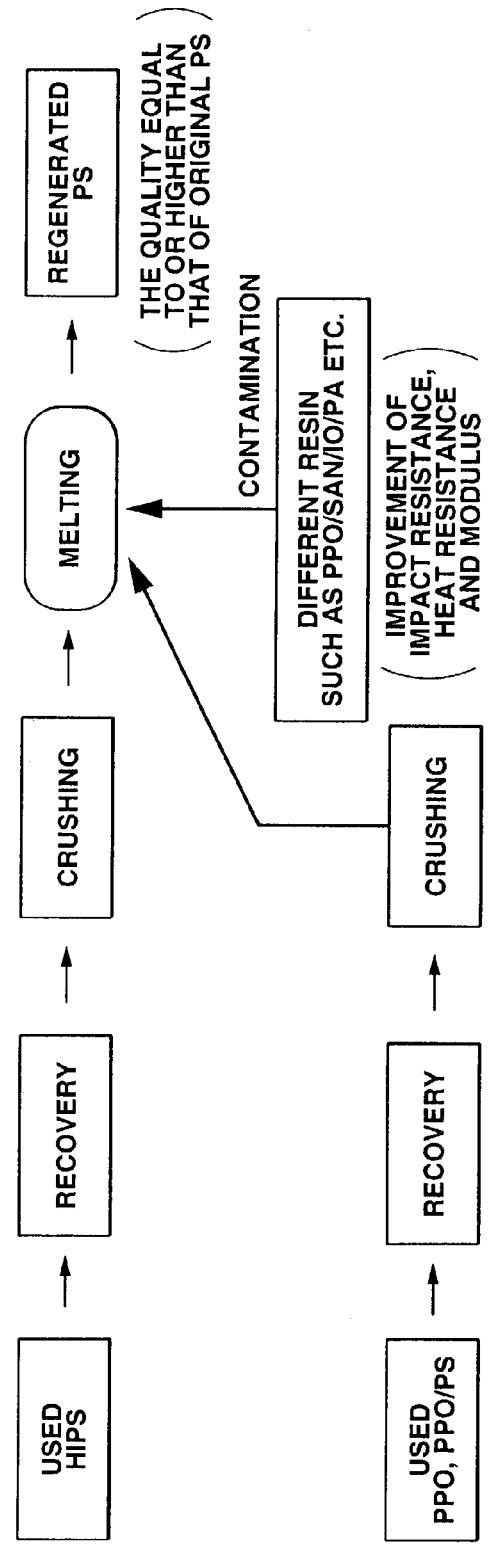

PROCESS FOR REGENERATING RESINS

TECHNICAL FIELD

The present invention relates to a process for regenerating and recycling a resin used for given purposes (hereinafter, referred to as "a resin to be regenerated").

BACKGROUND ART

When products are used up, they become waste products. Hitherto, these waste products have been collected, burnt up if necessary and treated by dumping the resulting residue in a landfill. Metals such as iron and copper, waste papers as well as rag have always been recycled and utilized. As a result, the waste products discarded as rubbish were only raw garbage from a kitchen mainly.

However, new materials, which were not an object of recycling, have recently been produced, supplied and utilized. The representative material is plastics.

For the purpose of the improvement of design, weight saving, price-reduction and the improvement of insulation properties of a product, plastics have been used as a housing, casing materials, component parts and cushioning materials in the product in various fields, for example in a wide variety of applications such as household appliances, products such as information processing equipments or communication equipments, automobiles and building materials. As a result, these plastics result a large amount of waste materials after used, but the most of the waste plastics have been treated by dumping them in a landfill or burning them up under the present circumstances.

As a countermeasure proposed for treating the waste plastics, for example, there is a technique as described in Japanese patent application Laid-Open Publication 7-203744. The technique described in this patent application Laid-Open comprises placing alternatively a refractory, non-acidic and porous particulate material and waste plastics as a stack into an incinerator and burning them to carbonize or incinerate the waste plastics.

However, the production of plastics further increases continuously and a wide variety of plastics are now produced at the level of about ten million ton for the year. In local governments, when such useful plastics reaches a stage to be treated as wastes, the treatment of the waste plastics has become a problem.

The waste plastics have been reused or recycled but parts of the used plastics have been only reused.

It can be said that the reason is because the deterioration in physical properties of plastics due to the change in properties with time during use, the contamination on recycling, the heat history and others makes recycling of plastics very difficult. However, since global environmental problems has become recently into the limelight, there is an eager demand for a technique utilizing effectively these used plastics in view of the effective utilization of limited resources, the waste problem, the generation of harmful gases or dust and others.

DISCLOSURE OF THE INVENTION

In view of the social background and the problems of conventional techniques as mentioned above, it is an object of the present invention to develop a technique for preventing the deterioration in the quality of plastics during the regeneration treatment of the used plastics and a technique for improving the quality of the regenerated resins. Furthermore, it is an object of the present invention to enable to use the regenerated plastics thus produced, as alternatives of woods, concrete, metals and the others.

In order to achieve the above-mentioned objects, the present inventors have eagerly studied on the regeneration of the used resins. As a result, the present inventors have now found that the quality of the used resin which is to be regenerated can be prevented from the deterioration or improved by adding to the resin to be regenerated, a resin of a type different from the resin to be regenerated, and further the inventors eagerly studied, thereby to have completed the present invention.

Namely, according to the present invention, there is provided a technique for preventing the deterioration in the quality of the used plastics during the regeneration treatment, or a technique for improving the quality of the regenerated resin.

Thus, the present invention is a process for regenerating a resin (A), characterized in that the salvaged material of the resin (A) to be regenerated is added at least one resin (B) of a type different from the resin (A) to be regenerated to regenerate the resin (A).

Furthermore, the present invention is a process for regenerating a resin (A), characterized in that a resin (C) comprising the salvaged material of the resin (A) to be regenerated and at least one resin (B) of a type different from the resin (A) is utilized in the same use application as the resin (A).

In the process for regenerating the resin (A) to be regenerated, as the resin (C) comprising the resin (A) to be regenerated and at least one resin (B) of a type different from the resin (A), a thermoplastic resin is used.

As the resin (B) of the type different from the resin (A) to be regenerated, a thermoplastic resin is used.

Furthermore, as the resin to be regenerated (A) and the resin (B), a compatible resin is used.

According to the process for regenerating a used resin of the present invention, the resin (A) to be regenerated is regenerated by adding to the resin (A) the resin (B) having given physical properties superior to those of the resin (A). Such physical properties are mechanical properties including impact resistance, or heat resistance including glass transition temperature.

Also, according to the process for regenerating a resin of the present invention, the resin (A) to be regenerated is regenerated by adding to the salvaged material of the resin (A) at least one salvaged material of the resin (B) to be regenerated of a type different from the resin (A).

The resin (A) to be regenerated herein has a styrene unit and the resin (B) is at least one of polyphenylene ether (PPE), polycarbonate (PC), an ionomer (IO), polybutadiene (PB), polyamide (PA), polyethylene terephthalate (PET), polyphenylene sulfide (PPS), liquid crystal polyester (LCP), polysulfone (PSF) and polyether sulfone (PESF).

Besides, the resin (A) to be regenerated, which is used in the process for regenerating the resin according to the present invention, is a polystyrene resin and the resin (B) is at least one of high impact polystyrene (HIPS), a styrene-acrylonitrile copolymer (SAN), a styrene-maleic anhydride copolymer, a styrene-maleimide copolymer, a styrene-butadiene elastomer (SBC), polyphenylene ether (PPE), an ionomer (IO), polybutadiene (PB), polyethylene terephthalate (PET), polyphenylene sulfide (PPS), liquid crystal polyester (LCP), polysulfone (PSF), polyether sulfone (PESF), a methacrylate-styrene copolymer (MS), polyamide, polybutylene terephthalate (PBT), ABS and PTFE.

Besides, the resin (A) to be regenerated, which is used in the process for regenerating the resin according to the present invention, is high impact polystyrene (HIPS) and the resin (B) is at least one of a styrene-acrylonitrile copolymer (SAN), polycarbonate (PC), a styrene-maleic anhydride copolymer, a styrene-maleimide copolymer, a styrene-butadiene elastomer (SBC), polyphenylene ether (PPE), an ionomer (IO), polybutadiene (PB), polyethylene terephthalate (PET), polyphenylene sulfide (PPS), liquid crystal polyester (LCP), polysulfone (PSF), polyether sulfone (PESF), a methacrylate-styrene copolymer (MS), polyamide, polybutylene terephthalate (PBT), ABS and PTFE.

Besides, the resin (A) to be regenerated, which is used in the process for regenerating the resin according to the present invention, is an acrylonitrile-butadiene-styrene copolymer (ABS) and the resin (B) is at least one of polycarbonate (PC), a chlorinated polyethylene-acrylonitrile-styrene copolymer (ACS), an acrylate-styrene-acrylonitrile copolymer (ASA), vinyl chloride (PVC), polyamide (PA), nylon, a styrene acrylonitrile copolymer (SAN), a styrene-maleic anhydride copolymer, a styrene-maleimide copolymer, a styrene-butadiene elastomer (SBC), polyphenylene ether (PPE), an ionomer (10), polybutadiene (PB), polyethylene terephthalate (PET), polyphenylene sulfide (PPS), liquid crystal polyester (LCP), polyacetal (POM), polysulfone (PSF), polybutylene terephthalate (PBT) and PTFE.

Furthermore, the resin (A) to be regenerated, which is used in the process for regenerating the resin according to the present invention, is polyethylene (PE) and the resin (B) is at least one of polypropylene (PP), an ionomer (IO), chlorinated polyethylene (CPE), an ethylene-vinyl acetate copolymer (EVA), a chlorosulfonated polyethylene (CSM), liquid crystal polyester (LCP).

Furthermore, the resin (A) to be regenerated, which is used in the process for regenerating the resin according to the present invention, is polypropylene (PP) and the resin (B) is at least one of an ionomer (IO), polyethylene (PE), chlorinated polyethylene (CPE), an ethylene-vinyl acetate copolymer (EVA), a chlorosulfonated polyethylene (CSM), liquid crystal polyester (LCP).

The above-mentioned resin (A) to be regenerated and the resin (B), which are used in the process for regenerating the resin according to the present invention, each contains an additive of the same color and/or type.

BRIEF DESCRIPTION OF THE DRAWINGS

In the drawings.

FIG. 2A shows a process for regenerating a used ABS resin by the conventional process and FIG. 2B shows a process for regenerating the used ABS resin by the process of this invention.; and FIG. 3A shows a process for regenerating a used HIPS resin by the conventional process and FIG. 3B shows a process for regenerating the used HIPS resin by the process of this invention.

BEST MODE FOR CARRYING OUT THE INVENTION

Hereinafter, the present invention will be explained in detail.

The resin (A) to be regenerated, which is an object of the present invention, includes for example polystyrene (PS), polypropylene (PP), polyethylene (PE), vinyl chloride (PVC), high impact polystyrene (HIPS), SAN (styrene-acrylonitrile) resin, ABS (acrylonitrile-butadiene-styrene) resin, a polyacrylonitrile resin (PAN), a nylon resin, a polyolefin (including polyethylene, polypropylene and polyisoprene) resin, polyphenylene ether (PPE), polyphenylene sulfide, polyacrylonitrile-butadiene (nitrile rubber), polycarbonate (PC), polyethylene terephthalate (PET), polybutylene terephthalate (PBT), polysulfone, polyarylsulfone, polyether sulfone, polythioether sulfone, polyether ketone, polyether imide, polyether ether ketone, polyamide (nylon), polyamideimide, polyimide, polyacrylate, an aromatic polyester, polyurethane, polyvinyl chloride, chlorinated polyether, polychloromethylstyrene, polyacrylic ester, polymethacrylate ester, celluloid, various liquid crystal polymers, a methacrylate resin (PMMA), a succinate resin, a terpene resin, an epoxy resin, a phenol-formalin resin, a melamine resin and others. Among them, a thermoplastic resin is preferable. Furthermore, these resins may be one having single composition or may be a mixture of two or more resins (including an alloy). Such alloy includes for example a polyphenylene ether/polystyrene polymer alloy, an engineering plastic polymer alloy and others.

The resin to be regenerated, which is used in the present invention, may be in the form as such used for given purpose such as a housing, or may be in the form separated from another resins or in the form of crushed products or pellets formed by remelting the crushed products. However, the resin to be regenerated is preferably in the form crushed after separated from another resins or in the form of pellet formed by remelting the crushed products, because the resin (A) to be regenerated is mixed (kneaded) with the resin (B) in the present invention.

Figure 1A:
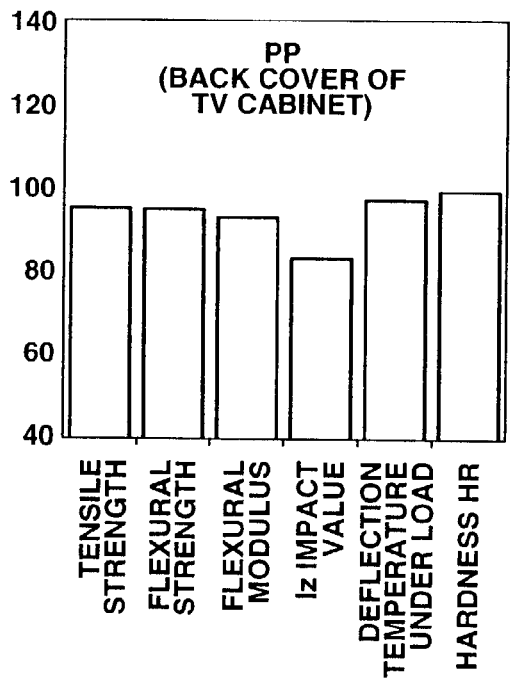
FIG. 1A to FIG. 1D are shown that physical properties of the waste plastic material deteriorate as compared with those of the original virgin plastic.
Figure 1B:
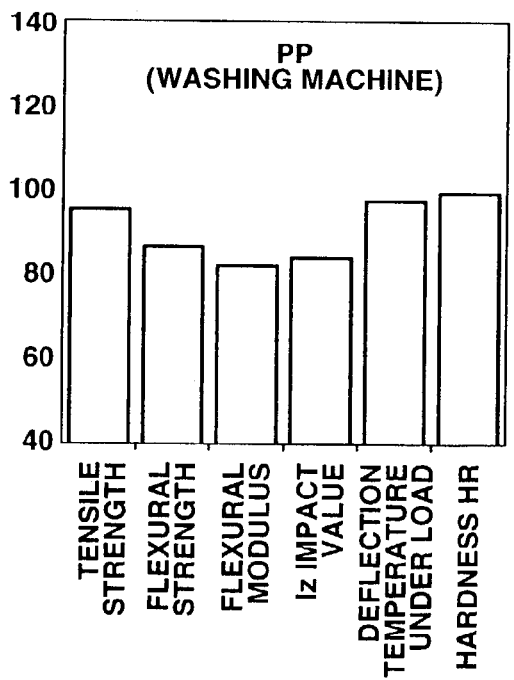
Figure 1C:
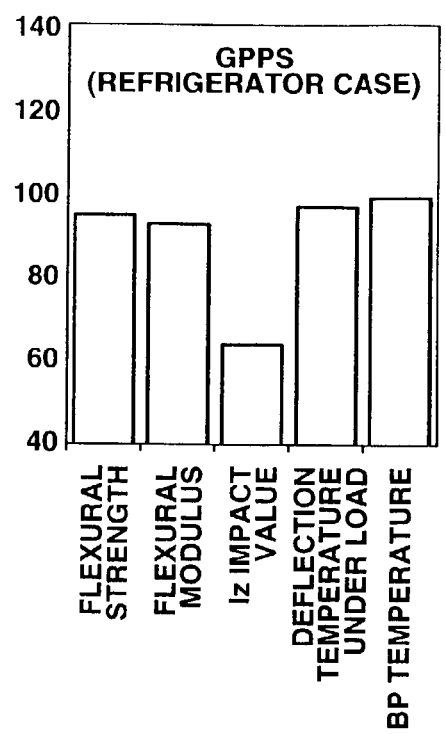
Figure 1D:
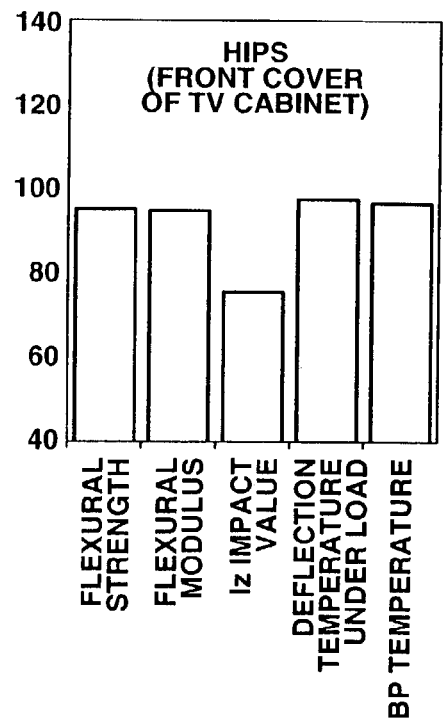

In the above mentioned resin (A) to be regenerated, physical properties of the resin has decreased due to the change in properties with time during use or the mechanical shock (grinding) and the heat history (melting and moulding) during recycling (refer to FIG. 1A to FIG. 1D). Thus, in order to improve the deteriorated quality, physical properties of the resin to be regenerated may be improved up to the level before use or higher by mixing the resin (B) having at least one of physical properties superior to the original properties of the resin (A) to be regenerated, with the used resin (A) which is to be regenerated. For example, by adding PPE resin to the HIPS resin used for the cabinet of a television set, the impact resistance of the regenerated HIPS resin may be improved up to that of the virgin resin.

A concrete example of the above-mentioned physical properties, there is included:
 (1) tensile strength,
 (2) flexural strength,
 (3) flexural modulus,
 (4) Iz impact value (Izod impact value),
 (5) MFR (melt flow rate),
 (6) deflection temperature under load,
 (7) hardness HR (Rockwell hardness),
 (8) BP temperature (Ball pressure temperature), and
 (9) glass transition point.

Each of these physical properties is described in Japanese Industrial Standards (JIS) which is effective at the filing of this patent application or can be easily measured by conventional methods used usually in this technical field. For example, the Iz impact value can be easily measured according to ASTM (D-256).

As mentioned above, in order to prevent the deterioration in the quality of the used resin (A) to be regenerated during the regeneration treatment of the used resin (A) and to improve the physical properties of the resin (A) to those before use or those higher than it, it is preferable that to the resin (A) to be regenerated is added a different type of resin (B) having at least one of physical properties superior to those of the original resin (A). For this reason, the selection of the resin (B) depends largely on the type of the resin (A) to be regenerated. In general, it is preferable that a resin of a grade higher than that of the resin (A) to be regenerated, for example an engineering plastic or others is selected as the resin (B).

The resin which is an object of the resin (B) used in this invention includes, for example, polyphenylene ether (PPE), polycarbonate (PC), an ionomer (IO), polybutadiene (PB), polyamide (PA), polyethylene terephthalate (PET), polyphenylene sulfide (PPS), polysulfone (PSF), polyether sulfone (PESF), a chlorinated polyethylene-acrylonitrile-styrene copolymer (ACS), an acrylate-styrene-acrylonitrile copolymer (ASA), vinyl chloride (PVC), polyamide (PA), nylon, a styrene-acrylonitrile copolymer (SAN), a styrene-maleic anhydride copolymer, a styrene-maleimide copolymer, a styrene-butadiene elastomer (SBC), liquid crystal polyester (LCP), polyacetal (POM), an ethylene-vinyl acetate-vinyl chloride copolymer, a methacrylate-styrene copolymer (MS), chlorinated polyethylene (CPE), an ethylene-vinyl acetate copolymer (EVA), chlorosulfonated polyethylene (CSM), a nitrile resin, an aromatic polyester, polyamideimide, polyarylate, polyarylsulfone (PASF), polybenzimidazole, polyether ether ketone (PEEK), polybutylene terephthalate (PBT), polyether imide (PEI), polyether ketone (PEK), polyether nitrile (PECN), polyether sulfone (PES), polythioether sulfone (PTES), polyimide (PI), polyamino bismaleimide (PABM), polyketone, polymethylpentene, thermoplastic polyurethane, polyvinylidene chloride and various thermoplastic elastomers.

As a basis for selecting the resin (B), there is included a compatibility with the resin (A) to be regenerated and the resin (B) having any of the physical properties which easily deteriorate during recycling the resin (A) to be regenerated and which are superior to those of the resin (A) is preferable. Furthermore, the resin (B) may consist of a single resin or may be a mixture of two or more resins (such as an alloy or an elastomer). In this addition, the resin (B) may be a used resin. In view of the effective utilization of resources, it is preferable to mix a used resin (B) with the used resin (A) to be regenerated.

When two or more polymers are mixed, the resulting mixture separates into a completely compatible system which is a homogeneous phase and an incompatible system which gives many layers formed by phase separation. By the "completely compatible" is meant that polymers are compatible with each other on the molecular level. Therefore, the completely compatible phase is homogeneous and does not have a layered structure and thus often has an average physical properties of polymers as in a polymer alloy of PPE/PS. Furthermore, plastics subjected to plastic recycling vary in properties and are often those of which complete compatibility is not almost expected. On the other hand, when polymers are incompatible with each other, they present a layered structure due to separation of phases. Thus, two polymers different in compatibility exist as a phase and therefore when morphology is controlled, the mixture of said two polymers may form a polymer alloy which combines the advantages of both resins and which is possible to satisfy various requirements. However, when two or more polymers different in their properties are mixed simply, they result macroscopically phase separation and therefore often do not give physical properties usable as a molding material. In this view, when polymers incompatible with each other are mixed, a compatibilizing agent for controlling morphology may be used.

TABLE 1

| Composition | Producer | Trade Name |
| --- | --- | --- |
| EVA/EPDA/polyolefinic graft copolymer | High Tech Plastics (Nagase & Co., Ltd.) | Benet |
| Polyolefinic graft polymer and reactive (GMA, MAH-containing) polyolefinic graft copolymer | NOF Corp. | Modiper A |
| P(St-co-GMA) | | Blenmer CP |
| EGMA | Sumitomo chemical Co., Ltd. | BONDFAST |
| P(Et-co-EA-co-MAH) | | BONDINE |
| EGMA | Nippon Oil Chemical Co., Ltd. | REXPERL |
| Olefinic graft copolymer | Mitsubishi Petrochemicals | VMX |
| Various reactive or non-reactive graft copolymer | Toagosei Co., Ltd | RESEDA |
| Maleic polyolefin | Mitsui Petrochemicals Industries, Ltd. | Admer |
| SEBS and other maleic compounds | Asahi Kasei Corp. | Taftec |

EVA: an ethylene-vinyl acetate copolymer
EPDM: an ethylene-propylene-diene copolymer
EGMA: an ethylene-glycidyl methacrylate copolymer
SEBS: a styrene-ethylene-butadiene-styrene copolymer
GMA: glycidyl methacrylate
MAH: maleic anhydride
EA: ethyl acrylate In also the present invention, when the resin (A) to be regenerated is mixed with the resin (B), a commercially available compatibilizing agent may be used according to the known techniques.

Furthermore, it is also known to improve the deteriorated physical properties of the resin (A) to be regenerated, by adding thereto an elastomer (for example, L. M. Chen et al., Plast. Eng., 33 (October 1989)). For example, this can be applied to polycarbonate for CD.

The resin (A) to be regenerated and the resin (B) may be mixed on their crushing, or may be mixed on their kneading and melting. The mixing ratio on mixing is not particularly limited but the resin (B) may be mixed with the resin (A) to be regenerated in a range of the weight ratio of 1/100 to 100 times relative to the resin (A). However, the material cost of the resin (B) is often more expensive than that of the resin (A) to be regenerated and thus it is more economical that the resin (B) is mixed with the resin (A) to be regenerated at the weight ratio not higher than 50%. However, the smaller the mixing ratio of the resin (B) is, the more difficult the effective prevention of the deterioration in quality of the resin (A) due to the regeneration treatment of the used resin (A) is.

Into the resin (A) to be regenerated and the resin (B), may be included an additive for a resin as exemplified by carbon black, for example an antistatic agent, a colorant and pigment, an antioxidant, a fire retardant, a plasticizer, a light-resistance accelerator, a compatibilising agent, a finishing agent, a modifier as well as various resin reinforcers such as glass fibre, paper and a nonwoven fabric. In particular, it is preferable that the resin (A) to be regenerated and the resin (B) contain an additive of the same colour and/or the same type.

Crushing, kneading, melting and mixing of the waste plastics may be carried out according to the known procedures. For example, the procedure described in Japanese patent application Laid-Open Publication 9-174021 may be employed. According to the present invention, recycling represented by the following equation becomes possible.

[Usage]–[(Recovery–Regeneration–Reuse)$_n$]–[Dumping in a landfill or Incineration], wherein n is an integer of 1 to 7.

As an typical example of the present invention, a novel process for regenerating a used ABS or a used HIPS is shown as compared with the process according to the invention and the conventional process.

Here, FIG. 2A shows a process for regenerating the used ABS according to the conventional process and FIG. 2B shows a process for regenerating the used ABS according to the invention process. Furthermore, FIG. 3A shows a process for regenerating the used HIPS according to the conventional process and FIG. 3B shows a process for regenerating the used HIPS according to the invention process.

The invention is illustrated by the following Examples but is not limited thereby.

EXAMPLE 1

PS resin used in a household electric appliance was recovered as a waste material. This resin was crushed to an average size of about 0.5 cm×0.5 cm×0.5 cm to afford a crushed product. The resulting crushed product was measured for Izot impact strength (notch) and glass transition point, whereby giving values of 2.2 (ft-lb/in) and 120° C. respectively.

The crushed product of the waste plastics was heated in an electric furnace until melted and to the resulting melt was added a PPE virgin pellet in such an amount that PPE mixing ratio ((PPE/waste PS)×100) after mixing is 20% or 40% under stirring and then the mixture was heated to be melt. After cooling, a regenerated plastic material was obtained. Physical properties of the regenerated plastic material thus obtained are as follows. From Table 2, it can been seen that physical properties were improved.

Furthermore, Izot impact strength (notch) was measured according to ASTM (D-256).

TABLE 2

|  | PPE mixing ratio | |
|---|---|---|
|  | 20% | 40% |
| Notch Izot impact strength (mechanical property) Unit: ft-lb/in | 3.3 | 5.2 |
| Glass transition temperature (thermal property) Unit: ° C. | 143 | 180 |

EXAMPLE 2

ABS resin used in a household electric appliance was recovered as a waste material. This resin was crushed to an average size of about 0.5 cm×0.5 cm×0.5 cm to afford a crushed product. The resulting crushed product was measured for Izot impact strength (Notch) and glass transition point, whereby giving values of 22.0 (ft-lb/in) and 95° C. respectively.

The crushed product of the waste plastics was heated in an electric furnace until melted and to the resulting melt was added a PC virgin pellet in such an amount that PC mixing ratio ((PC virgin pellet/waste ABS)×100) after mixing is 25% or 50% under stirring and then the mixture was heated to be melt. After cooling, a regenerated plastic material was obtained. Physical properties of the regenerated plastic material thus obtained are as follows. From Table 3, it can been seen that physical properties were improved.

Furthermore, Izot impact strength (notch) was measured according to ASTM (D-256).

TABLE 3

|  | PC mixing ratio | |
|---|---|---|
|  | 25% | 50% |
| Notch Izot impact strength (mechanical property) Unit: kgf · cm/cm | 33 | 52 |
| Glass transition point Unit: ° C. | 103 | 108 |

INDUSTRIAL APPLICABILITY

As mentioned above, by adding to the used resin (A) to be regenerated the resin (B) having at least one of given physical properties superior to those of the resin (A), it is possible to prevent the deterioration in the quality of the resin (A) on the regeneration treatment or to improve the quality. Therefore, it is possible to utilize the regenerated resin (A) in the same use application as that of the resin to be regenerated. This process can be used even when a number of recycling of the resin (A) to be regenerated becomes 2 times or more. Accordingly, in view of the effective utilization of sources and the reduction of wastes, it is possible to contribute to the continuous social progress.

As the present invention provides an effective technique for regenerating the used resin which was discarded as wastes due to deterioration in the quality on the regeneration treatment, it can contribute to the global environmental protection in the view of the effective utilization of sources and the reduction of wastes.

The invention claimed is:

1. A process for manufacturing a regenerated resin, the regenerated resin comprising polycarbonate (PC) and acrylonitrile-butadiene-styrene (ABS) resin, said process comprising the step of adding PC resin to ABS resin, wherein;
 (a) the ratio B/A is at least 0.25 and at most 0.50, B being the weight of the PC in the regenerated resin and A being the weight of the ABS in the regenerated resin;
 (b) the Notch Izot impact strength impact of the regenerated resin is at feast 33 ft-lb/in and at most 52 ft-lb/in;
 (c) the glass transition temperature of the regenerated resin is at least 103° C. and at most 108° C.

* * * * *

UNITED STATES PATENT AND TRADEMARK OFFICE
CERTIFICATE OF CORRECTION

PATENT NO. : 7,037,951 B2  Page 1 of 1
APPLICATION NO. : 10/296863
DATED : May 2, 2006
INVENTOR(S) : Yasuhito Inagaki It is certified that error appears in the above-identified patent and that said Letters Patent is hereby corrected as shown below:

ON THE TITLE PAGE,

Insert Item:

--(30) Foreign Application Priority Data

Mar. 28, 2001 (JP)        2001-93981--

Signed and Sealed this

Eleventh Day of July, 2006

JON W. DUDAS
*Director of the United States Patent and Trademark Office*